UNITED STATES PATENT OFFICE.

CURT KOHLER, OF ALTENBURG, GERMANY.

NUTRITIVE PREPARATION.

No. 814,968.   Specification of Letters Patent.   Patented March 13, 1906.

Application filed March 10, 1905. Serial No. 249,505.

*To all whom it may concern:*

Be it known that I, CURT KÖHLER, master cook, a subject of the German Emperor, and a resident of Altenburg, in the Duchy of Saxe-Altenburg, German Empire, have invented certain new and useful Improvements in and Relating to Nutritive Preparations, of which the following is a specification.

The present invention relates to an improved nutritive preparation consisting of the white of eggs, spinach, peas, and sugar, mingled together in the form of a powder.

The new preparation may advantageously be manufactured in the following manner: The white of a number of fresh eggs is dried on large tinned plates in a drying apparatus, then pulverized in a ball-mill and passed through silk-bottomed sieves, the fine dusty substance resulting being fed into a mixing-drum. A quantity of choice, well-washed, fresh spinach is spread on coarse haircloth frames and placed in the drying apparatus to dry, then pulverized in the mill and passed through silk sieves, this finely-divided substance likewise being fed into the drum. In like manner a quantity of selected shelled peas is washed and steamed or boiled soft, spread on large tinned plates, dried in the drying apparatus, and then pulverized in the mill, being finally passed through silk sieves, so that a fine dusty product falls into the mixing-drum. Similarly, a quantity of white-sugar candy is pulverized in the mill and passed through the silk sieves into the mixing-drum. The whole of the finely-powdered ingredients is then mingled by rotation of the drum by motor or other power. The preparation when thoroughly mixed is ready for use. It is preferably filled into glass bottles having well-ground glass stoppers.

Having thus described my invention, what I claim as new is—

A powdery nutritive preparation, consisting of the white of eggs, spinach, peas and sugar, prepared substantially as described.

In witness whereof I have hereunto signed my name, this 14th day of February, 1905, in the presence of two subscribing witnesses.

CURT KÖHLER.

Witnesses:
ULYSSES J. BYWATER,
MATHILDE K. HELD.